No. 608,939. Patented Aug. 9, 1898.
R. WALSH.
GASKET PACKING.
(Application filed Sept. 4, 1897.)
(No Model.)
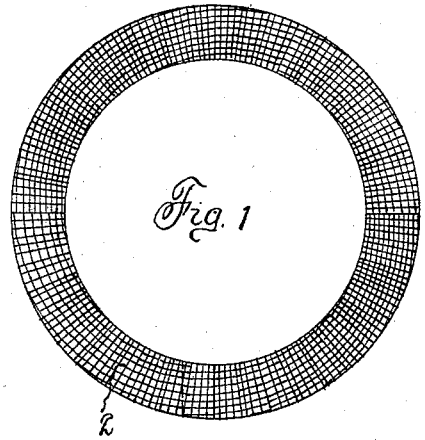
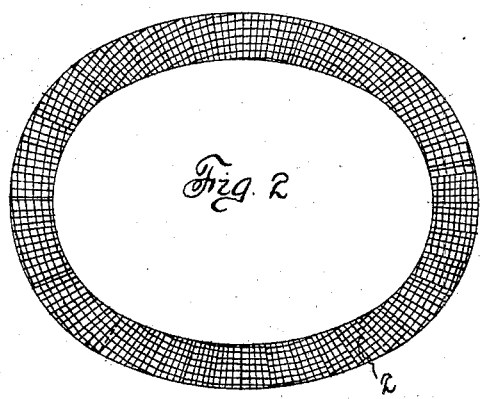
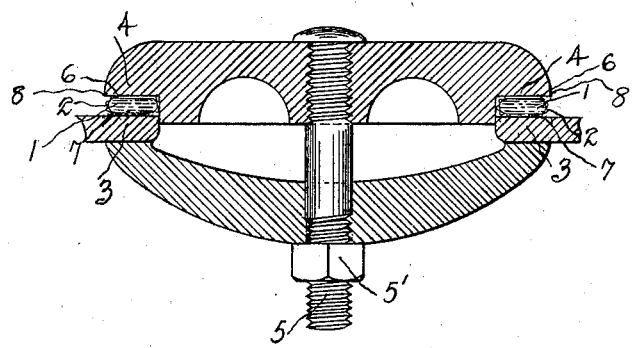
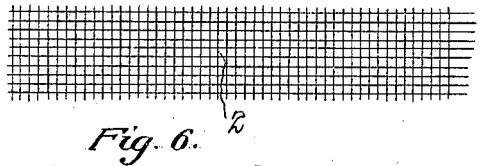
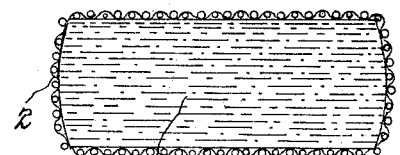
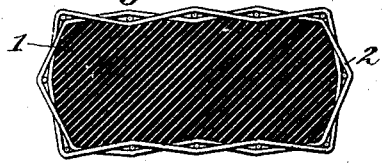
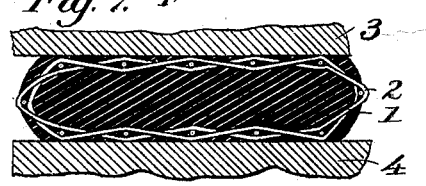
WITNESSES:
INVENTOR

UNITED STATES PATENT OFFICE.

RICHARD WALSH, OF PHILADELPHIA, PENNSYLVANIA.

GASKET PACKING.

SPECIFICATION forming part of Letters Patent No. 608,939, dated August 9, 1898.

Application filed September 4, 1897. Serial No. 650,615. (No model.)

*To all whom it may concern:*

Be it known that I, RICHARD WALSH, a citizen of the United States, residing at Philadelphia, in the county of Philadelphia and State of Pennsylvania, have invented certain new and useful Improvements in Gasket Packings; and I do hereby declare the following to be a sufficiently full, clear, and exact description thereof as to enable others skilled in the art to make and use the said invention.

This invention relates to gaskets for packing joints in metallic vessels to render them fluid-tight under pressure, and is especially applicable to such gaskets as are employed in closing the joints of manhole-plates and handhole-plates of steam-boilers, and has for its object the greater durability of such packings, rendering them safer for retention of fluids under pressure and susceptible of repeated reapplication and use after reopening the joint to which they are applied.

To this end this invention consists in a gasket of soft or yielding packing material, such as vulcanized india-rubber and canvas, with a covering or serving of open woven ductile wire tape wound helically upon it, so as to limit the lateral spreading of the soft material and yet permit the soft part to press between the meshes of the wire tape into fluid-tight contact with the surfaces of metal forming the joint, thus producing a more durable joint in use and one susceptible of removal from the metal without impairment and capable of frequent reapplication and use, and such gaskets form a useful and convenient article of manufacture, because of the wire covering protecting them from injury in transportation and assisting in holding the gasket in shape and position while being applied to the joint.

The mode of making and using the gaskets is hereinafter particularly described, and shown in the accompanying drawings, in which—

Figure 1 shows a gasket of circular form embodying this invention. Fig. 2 shows another of elliptical form. Fig. 3 shows a transverse section thereof. Fig. 4 shows a portion of the wire tape used to cover or serve the gasket. Fig. 5 shows in section a handhole-plate with one of the gaskets applied to use. Fig. 6 shows an enlarged cross-section of my improved gasket before application to use; and Fig. 7 shows an enlarged section of the same as applied and compressed between the two surfaces, forming a fluid-tight joint.

Referring to the drawings, 1 represents the soft body of the gasket; 2, the wire-tape serving or cover.

The soft part 1 of the gasket is made in the usual manner of vulcanized india-rubber with lamina of canvas or other forms of fiber incorporated in it to give it body. The wire tape is of soft ductile wire, such as bronze or copper, and should be woven with large apertures and have the wires lengthwise and crosswise, so as to have strength longitudinally. This is wrapped in a helical direction firmly around the part 1 and is pressed firmly upon it.

In applying the gaskets to use they are pressed between the parts 3 and 4, as shown in Figs. 4 and 7. The parts are then drawn up tightly by the screw 5 and nut 5'. The wire tape 2 is pressed into the body 1 and by its tenacity restrains the body 1 from spreading laterally, and the softer part pushes through the interstices between the wires of the tape into contact with the surfaces 6 and 7 of the joint.

The wire tape should be of fine wires and of large spaces or interstices, the function of the wire being to bind the soft material against undue spreading and to protect it from injury when being removed in opening a joint, the wire preventing the cutting of the soft material of the gasket by any implements employed in raising it from the surface forming the joint. The wires are not an element in making fluid-tight contact, such function being performed by the soft material of the gasket pressing through the interstices of the wire tape.

When the joint is reopened, the wires hold the softer part 1 of the gasket together, and it is readily removed without breaking, and if allowed to remain on the part 4, by reason of not projecting beyond the margin or edge 8 of the part 4, it is not apt to be injured in falling as other packing, having nothing but the tenacity of the soft part to prevent them spreading. In practical use these packings are used satisfactorily many times and are a valuable and useful article of manufacture and merchandise.

I am aware that stuffing-box packings have been made wherein a serving of closely-woven fabric has been made to cover and protect from abrasion and wear the softer portion of the packing. These are dissimilar from my improved gasket packing, and to such packings I make no claim; but, Having described my invention, what I claim is—

A new and useful article of manufacture, consisting of a gasket having a soft body served or wrapped helically with an open woven ductile wire tape adapted when compressed to permit the soft material of the body to pass through the interstices of the tape and susceptible of application to the joints of vessels for retaining fluids under pressure, as set forth.

RICHARD WALSH.

Witnesses:
C. R. MORGAN,
A. A. MORGAN.